United States Patent
Lee et al.

(10) Patent No.: US 7,583,042 B2
(45) Date of Patent: Sep. 1, 2009

(54) DEVICE AND METHOD FOR DRIVING A SINGLE PHASE MOTOR

(75) Inventors: Meng-Hsun Lee, Taipei County (TW); Chi-Lin Hsu, Taipei County (TW)

(73) Assignee: Princeton Technology Corporation, Taipei County (TW)

( * ) Notice: Subject to any disclaimer, the term of this patent is extended or adjusted under 35 U.S.C. 154(b) by 48 days.

(21) Appl. No.: 12/003,938

(22) Filed: Jan. 3, 2008

(65) Prior Publication Data

US 2009/0022483 A1    Jan. 22, 2009

(30) Foreign Application Priority Data

Jul. 17, 2007    (TW) .............................. 96125974 A

(51) Int. Cl.
    *G05B 5/00*    (2006.01)
(52) U.S. Cl. ................... 318/471; 318/400.22; 388/815
(58) Field of Classification Search ................. 318/471, 318/400.22, 812; 388/815; 327/77
    See application file for complete search history.

(56) References Cited

U.S. PATENT DOCUMENTS

2003/0030419 A1*    2/2003    Murakata et al. ............ 323/283

* cited by examiner

*Primary Examiner*—Karen Masih
(74) *Attorney, Agent, or Firm*—Muncy, Geissler, Olds & Lowe, PLLC

(57) ABSTRACT

A driving device is provided for controlling the rotation of a motor. The driving device comprises an input module, a comparing module and a processing module. The input module includes a voltage generating unit and a voltage adjusting unit to generate a comparing voltage. The voltage generating unit generates a voltage signal according to a basis voltage. The voltage adjusting unit is coupled to the voltage generating unit for adjusting the voltage signal and generating the comparing voltage according a reference voltage. The comparing module is coupled to the input module for comparing a selecting signal with the comparing voltage and generating a comparing signal. The processing module is coupled to the comparing module and generates a control signal according to the comparing signal. The driving device controls the rotation of the motor according to the control signal.

20 Claims, 3 Drawing Sheets

DEVICE AND METHOD FOR DRIVING A SINGLE PHASE MOTOR

BACKGROUND OF THE INVENTION

1. Field of the Invention

The invention relates generally to a driving device, and more particularly to a driving device for controlling the rotation of a single phase motor.

2. Description of the Related Art

As various components inside computer systems consume more and more power, radiation heat correspondingly becomes more and more of an issue. An outstanding example can be seen when looking at the central processing unit (CPU). The older 386 CPU contains hundred thousands of transistor counts, while the newer Pentium 4 CPU contains more than 50 million transistor counts. The surface temperature of a common CPU may reach 50 to 80 degrees centigrade, and the inner temperature may reach 80 to 100 degrees centigrade. As such, various heat dissipation devices have been developed, and the most common is the use of a heat dissipating fan driven by a motor to remove heat.

The rotational speed of conventional heat dissipating fans is controlled by a driving current provided by motor control devices. Different driving currents drive the heat dissipating motor to rotate at different speeds in accordance with different levels of heat dissipation. It has become a main object for those with ordinary skill in the art to develop motor systems with efficient heat dissipating ability according to actual temperature status in electronics systems. The motor system would provide a precise driving current for control of suitable motor rotational speeds.

BRIEF SUMMARY OF THE INVENTION

The invention provides a driving device for controlling the rotation of a motor comprising an input module, a comparing module, and a processing module. The input module includes a voltage generating unit and a voltage adjusting unit to generate a comparing voltage. The voltage generating unit generates a voltage signal according to a basis voltage. The voltage adjusting unit coupled to the voltage generating unit adjusts the value of the voltage signal so as to generate the comparing voltage according to a reference voltage. The comparing module coupled to the input module compares a selecting signal with the comparing voltage to generate a comparing signal. The processing module coupled to the comparing module generates a control signal according to the comparing signal. In addition, the driving device controls the rotation of the motor according to the control signal.

The invention also provides a driving method for controlling the rotation of a motor comprising the following steps of generating a voltage signal according to a basis voltage by: adjusting the value of the voltage signal according to a reference voltage to generate a comparing voltage; comparing the comparing voltage with a selecting signal to generate a comparing signal; generating a control signal according to the comparing signal; and controlling the rotation of the motor according to the control signal.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1:
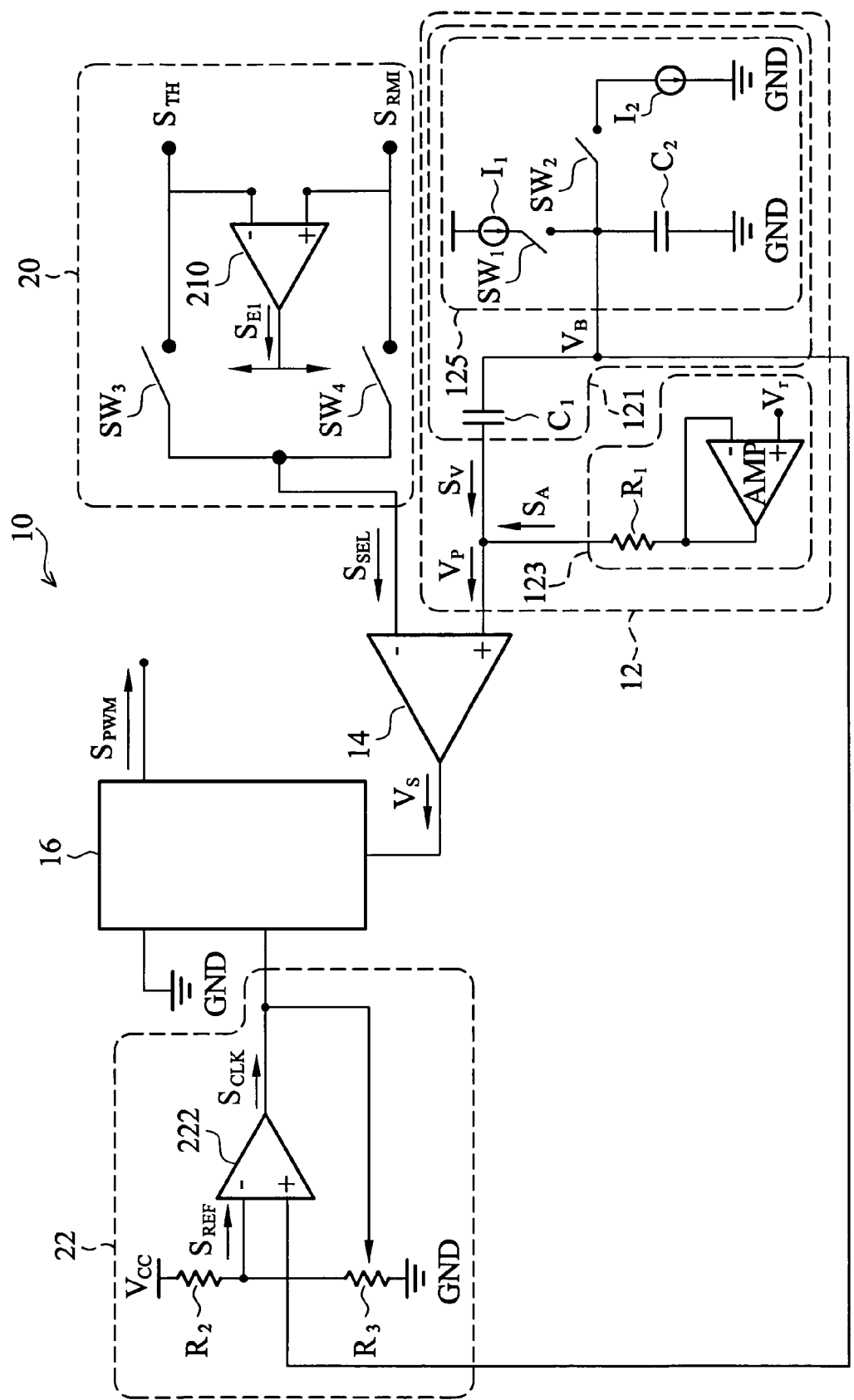
FIG. 1 is a schematic diagram of a driving device according to an embodiment of the invention.
Figure 2:
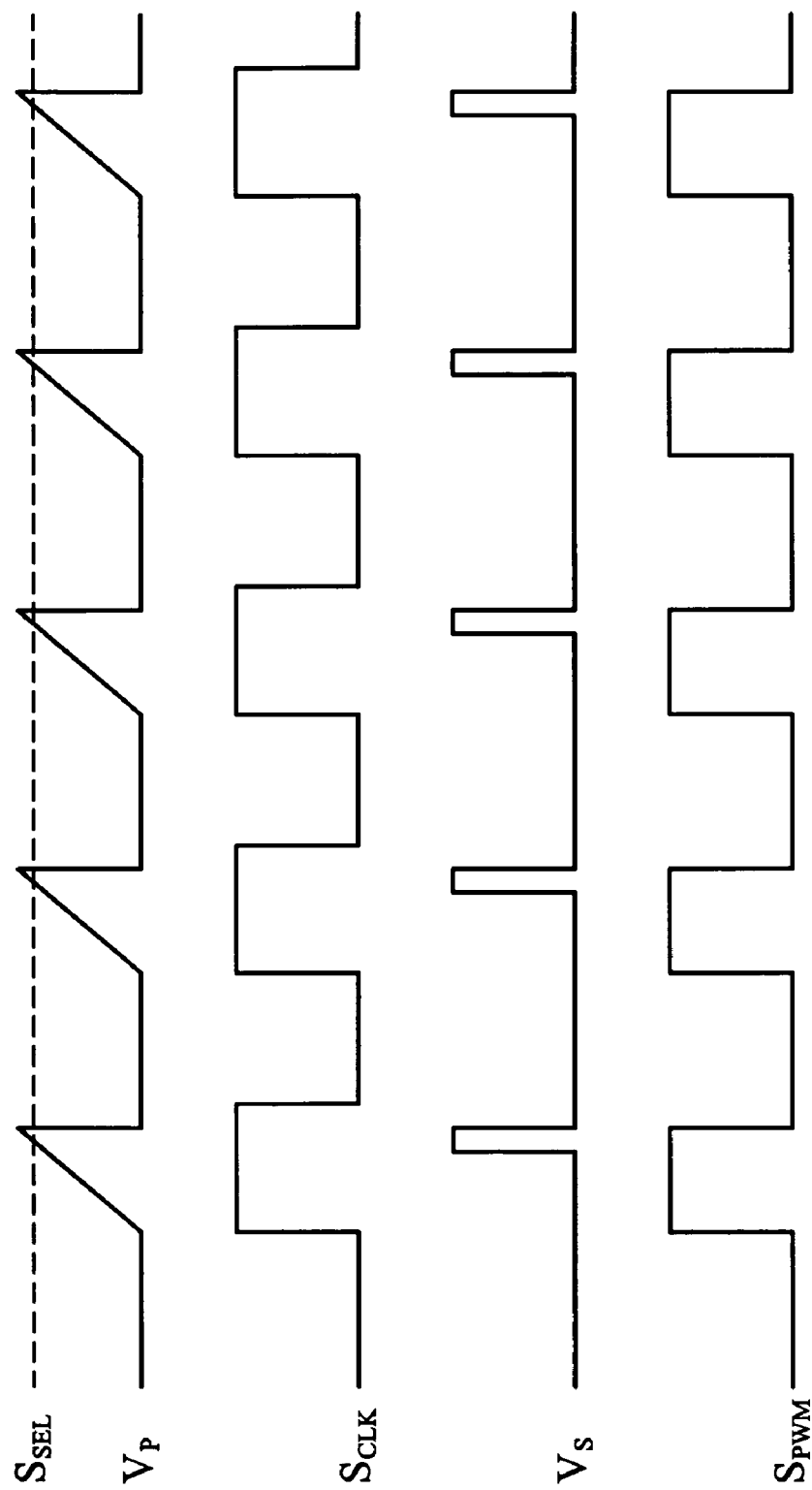
FIG. 2 is a waveform diagram of the driving device shown in FIG. 1.

Please refer to FIGS. 1 and FIG. 2. FIG. 1 is a schematic diagram of a driving device 10 according to an embodiment of the invention. FIG. 2 is a waveform diagram of the driving device 10 shown in FIG. 1. As illustrated in FIG. 1 and FIG. 2, a driving device 10 comprises an input module 12, a comparing module 14, and a processing module 16. The input module 12 comprising a voltage generating unit 121 and a voltage adjusting unit 123 is configured to generate a comparing voltage $V_P$. The voltage generating unit 121 is configured to generate a voltage signal $S_V$ according to a basis voltage $V_B$. The voltage adjusting unit 123 coupled to the voltage generating unit 121 is configured to adjust the value of the voltage signal $S_V$ to generate the comparing voltage $V_P$ according to a reference voltage $V_r$. The comparing module 14 coupled to the input module 12 is configured to compare the comparing voltage $V_P$ with a selecting signal $S_{SEL}$ to generate a comparing signal $V_S$. The processing unit 16 coupled to the comparing module 14 is configured to generate a control signal $S_{PWM}$ according to the comparing signal $V_S$. Accordingly, the driving device 10 controls the rotation of the motor (not shown) according to the control signal $S_{PWM}$. In one preferred embodiment of the invention, the comparing module 14 is a comparator, the processing unit 16 is a flip-flop, and the driving device 10 is formed of an integrated circuit. In addition, the motor (not shown) is a single phase motor.

The generating unit 121 comprises a first capacitor $C_1$ and a basis voltage generating unit 125. The first capacitor $C_1$ is charged/discharged to generate the voltage signal $S_V$ according to the basis voltage $V_B$. The basis voltage generating unit 125 comprises a first current source $I_1$, a second current source $I_2$ and a second capacitor $C_2$. The second capacitor $C_2$ coupled to the first current source $I_1$ and a ground GND is charged/discharged to generate the basis voltage $V_B$. The second current source I2 coupled to the second capacitor $C_2$ and the ground GND adjusts the value of the basis voltage $V_B$. Furthermore, the basis voltage generating unit 125 comprises a first switch $SW_1$ and a second switch $SW_2$, wherein the first switch $SW_1$ is coupled to the first current source $I_1$ and the second capacitor $C_2$, and the second switch $SW_2$ is coupled to the second current source $I_2$ and the second capacitor $C_2$. The first switch $SW_1$ and the second switch $SW_2$ are turned on/off according to a clock signal $S_{CLK}$ for charging/discharging the capacitor $C_2$ from the first current $I_1$ or the second current $I_2$.

The voltage adjusting unit 123 comprises a first amplifier AMP and a first resistor $R_1$. The first amplifier AMP amplifies the reference voltage $V_r$ to generate an adjusting signal $S_A$. The first resistor $R_1$ is coupled to the first amplifier AMP and the voltage generating unit 121. The voltage adjusting unit 123 adjusts the value of the voltage signal $S_V$ to generate the comparing voltage $V_P$ according to the adjusting signal $S_A$. Note that the reference voltage $V_r$ is either a first input signal $S_{TH}$ or a second input signal $S_{RMI}$.

The driving module 10 further comprises a clock generating module 22 coupled to the processing unit 16 and the basis voltage generating unit 125 to generate the clock signal $S_{CLK}$ according to the basis voltage $V_B$ and a reference signal $S_{REF}$. The clock generating module 22 comprises a first voltage source $V_{CC}$, a second resistor $R_2$, a third resistor $R_3$ and a second comparator 222. One terminal of the second resistor $R_2$ is coupled to the first voltage source $V_{CC}$. One terminal of the third resistor $R_3$ is coupled to the other terminal of the second resistor $R_2$. Further, the other terminal of the third resistor $R_3$ is coupled to the ground GND. A first input terminal of the comparator 222 is coupled to the second resistor $R_2$ and the third resistor $R_3$ for receiving the reference signal $S_{REF}$. A second terminal of the comparator 222 is coupled between the first current source $I_1$ and the second capacitor $C_2$ of the basis voltage generating unit 125 for receiving the basis voltage $V_B$. The second comparator 222 compares the basis voltage $V_B$ with the reference signal $S_{REF}$ to generate the clock signal $S_{CLK}$, wherein the reference signal $S_{REF}$ is generated between the second resistor $R_2$ and the third resistor $R_3$.

In one preferred embodiment, the third resistor $R_3$ of the clock generating module 22 is a variable resistor. The value of the third resistor R3 is dependent on the clock signal $S_{CLK}$ for adjusting the reference signal $S_{REF}$.

The driving device 10 according to the embodiment of the invention further comprises a selecting module 20 coupled to the comparing module 14 to generate the selecting signal $S_{SEL}$. The selecting module 20 comprises a first comparator 210, a third $SW_3$, and a fourth switch $SW_4$. The first comparator 210 compares the first input signal $S_{TH}$ with the second input signal $S_{RMI}$ to generate a first comparing signal $SE_1$. The third switch $SW_3$ coupled to one input terminal of the first comparator 210 is switched on/off according to the first comparing signal $SE_1$ and then selectively inputs the first input signal $S_{TH}$. The fourth switch SW4 coupled to the other input terminal of the first comparator 210 is switched on/off according to the first comparing signal $SE_1$ and then selectively inputs the second input signal $S_{RMI}$. Accordingly, the selecting module 20 generates the selecting signal $S_{SEL}$ according to the first input signal $S_{TH}$ and the second input signal $S_{RMI}$, wherein the selecting signal $S_{SEL}$ is either the first input signal $S_{TH}$ or the second input signal $S_{RMI}$.

In a preferred embodiment, the first input signal $S_{TH}$ is a temperature detecting voltage corresponding to the environmental temperature located outside of the driving device 10. The second input signal $S_{RMI}$ is a predetermined voltage driving the rotation of the motor at the lowest speed. When the third switch $SW_3$ is on, the selecting signal $S_{SEL}$ is the first input signal $S_{TH}$. When the fourth switch $SW_4$ is on, the selecting signal $S_{SEL}$ is the second input signal $S_{RMI}$. In another preferred embodiment, the first comparator 210 compares the first input signal $S_{TH}$ with the second input $S_{RMI}$. When the logic level of the first comparing signal $SE_1$ is "1" the third switch $SW_3$ is subsequently turned on and the fourth switch $SW_4$ is turned off. Thus, the selecting module 20 outputs the first input signal $S_{TH}$ indicating the temperature corresponding to the environmental temperature to the comparing module 14. When the logic level of the first comparing signal $SE_1$ is "0", the fourth switch $SW_4$ is subsequently turned on, the third switch $SW_3$ is turned off, and the second input signal $S_{RMI}$ indicating the lowest speed of the motor (not shown) is output to the comparing module 14 for further operation.

Please refer to FIGS. 1 and 2. FIG. 2 is a waveform diagram of the driving device 10 shown in FIG. 1. The operation of the driving device 10 according to the invention is further detailed in the following. As shown in FIGS. 1 and 2, to begin, the comparator 210 compares the first input signal $S_{TH}$ with the second input signal $S_{RMI}$ to control the third switch $SW_3$ and the fourth switch $SW_4$ according to the first comparing signal SE1, in order to output the first input signal $S_{TH}$ or the second input signal $S_{RMI}$ to the comparing module 14. Note that the comparing voltage $V_P$ of the invention is floating. Further, the comparing module 14 successively compares the comparing voltage $V_P$ with the first input signal $S_{TH}$ or the second input signal $S_{RMI}$ until the comparing voltage VP is greater than the first input signal $S_{TH}$ or the second input signal $S_{RMI}$. The logic level of the control signal $S_{PWM}$ then switches from "0" to "1" to control the rotation of the motor.

Figure 3:
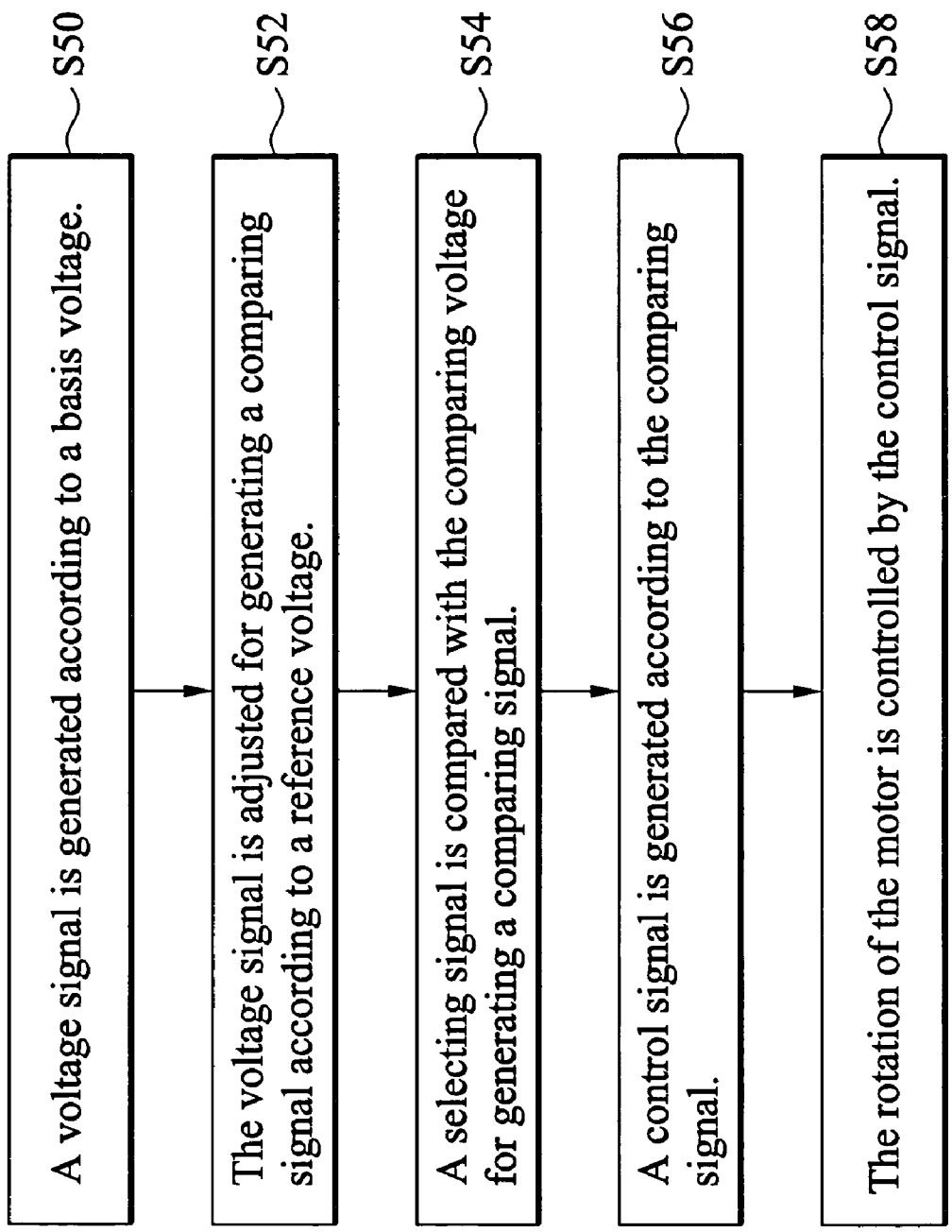
FIG. 3 is a flow chart of a driving method according to an embodiment of the invention.

Please refer to FIG. 3. FIG. 3 is a flow chart of a driving method according to another embodiment of the invention. As illustrated in FIG. 3, the driving method is provided for controlling the rotation of a motor, wherein the motor is a single phase motor. The driving method comprises the following steps.

In step S50, a voltage signal is generated according to a basis voltage. According to one embodiment of the invention, a first capacitor is charged/discharged to generate the voltage signal according to the basis voltage. Moreover, in this embodiment, a second capacitor is charged/discharged to generate the basis voltage. Further, charge/discharge of the second capacitor is dependent on a clock signal.

In step S52, the value of the voltage signal is adjusted to generate a comparing signal according to a reference voltage. In one embodiment, step S52 comprises the steps of amplifying the reference voltage to generate an adjusting signal and adjusting the value of the voltage signal to generate the comparing voltage according to the adjusting signal. Note that the reference voltage is either a first input signal or a second input signal.

In step S54, a selecting signal and the comparing voltage are compared to generate a comparing signal. Moreover, in step S54, the first input signal and the second input signal are compared to generate a first comparing signal. Next, the first input signal and the second input signal are selected according to the first comparing signal. Finally, the selecting signal is generated according to the input from the first input signal or the second input signal. In one embodiment, the first input signal is a temperature detecting voltage corresponding to the environmental temperature located outside of the motor. And the second input signal is a predetermined voltage driving the motor to rotate at the lowest speed. In addition, the selecting signal is either the first input signal or the second input signal.

In step S56, a control signal is generated according to the comparing signal.

In step S58, the rotation of the motor is controlled by the control signal.

The driving device according to the described embodiments of the invention controls the rotational speed of the motor according the logic level and the period of the self-generated control signal. For example, when the logic level of the control signal is high, the driving device drives additional current to a single phase motor, resulting in a faster motor speed for the object controlling the rotation of the motor. In addition, the control signal generated by comparing the first input signal with the second input signal is capable of controlling the motor corresponding to the environment, and driving the motor rotating at the lowest speed. Consequently, the best effect of radiation heat transfer is achieved.

While the invention has been described by way of example and in terms of preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A driving device for controlling the rotation of a motor, comprising:
   an input module used for generating a comparing voltage comprising:
      a voltage generating unit used for generating a voltage signal according to a basis voltage; and
      a voltage adjusting unit coupled to the voltage generating unit for adjusting the value of the voltage signal as well as generating the comparing voltage according to a reference voltage;
   a comparing module coupled to the input module comparing the comparing voltage with a selecting signal to generate a comparing signal; and
   a processing unit coupled to the comparing module for generating a control signal according to the comparing signal;
   wherein the driving device controls the rotation of a motor according to the control signal.

2. The driving device as claimed in claim 1, wherein the voltage generating unit comprises a first capacitor to generate the voltage signal according to charge/discharge of the basis voltage.

3. The driving device as claimed in claim 1, wherein the voltage generating unit further comprises a basis voltage generating unit comprising:
   a first current source; and
   a second capacitor coupled between the first current source and a ground for charging/discharging so as to generate the basis voltage.

4. The driving device as claimed in claim 3, wherein the basis voltage generating unit further comprises a second current source coupled between the second capacitor and the ground for adjusting the value of the basis voltage.

5. The driving device as claimed in claim 4, wherein the basis voltage generating unit further comprises a first switch and a second switch, the first switch coupled between the first current source and the second capacitor for charging/discharging the second capacitor according to turn on/off the first switch corresponding to a clock signal, the second switch coupled to the second current source and the second capacitor for charging/discharging the second capacitor according to turning on/off the second switch corresponding to the clock signal.

6. The driving device as claimed in claim 3, wherein the voltage adjusting unit comprises:
   a first amplifier for amplifying the reference voltage so as to generate an adjusting signal; and
   a first resistor coupled between the first amplifier and the voltage generating unit;
   wherein the voltage adjusting unit adjusts the value of the voltage signal to generate the comparing voltage according to the adjusting signal.

7. The driving device as claimed in claim 6, wherein the reference voltage is either a first input signal or a second input signal.

8. The driving device as claimed in claim 1, wherein the driving device further comprises a selecting module coupled to the comparing module for generating the selecting signal, and the selecting module comprises:
   a first comparator used for comparing the first input signal with the second input signal to generate a first comparing signal;
   a third switch coupled to one terminal of the first comparator for turning on/off according to the first comparing signal, to selectively input the first input signal; and
   a fourth switch coupled to the other terminal of the first comparator to turn on/off according to the first comparing signal, to selectively input the second input signal;
   wherein the selecting module generates the selecting signal according to the first input signal and the second input signal.

9. The driving device as claimed in claim 8, wherein the selecting signal is either the first input signal or the second input signal.

10. The driving device as claimed in claim 9, wherein the first input signal is a temperature detecting voltage corresponding to the environmental temperature located outside of the driving device, the second input signal is a predetermined voltage driving the rotation of the motor at the lowest speed.

11. The driving device as claimed in claim 5, further comprising a clock generating module coupled to the processing module and the basis voltage generating unit to generate the clock signal according to the basis voltage and a reference signal, and the clock generating module comprises:
   a first voltage source;
   a second resistor having one terminal coupled to the first voltage source;
   a third resistor having one terminal coupled to the other terminal of the second resistor, and the other terminal coupled to the ground; and
   a second comparator having a first input terminal coupled between the second resistor and the third resistor for receiving the reference signal and a second input terminal coupled to the basis voltage generating unit for receiving the basis voltage, wherein the second comparator generates the clock signal according to comparison outcome of the reference signal and the basis voltage;
   wherein the reference signal is generated between the second resistor and the third resistor.

12. The driving device as claimed in claim 11, wherein the third resistor of the clock generating module is a variable resistor for adjusting the reference signal according to the resistance value adjusted by the clock signal.

13. A driving method for controlling the rotation of a motor comprising the following steps:
   (a) generating a voltage signal according to a basis voltage;
   (b) adjusting the value of the voltage signal so as to generate a comparing voltage according to the value of the voltage signal;
   (c) comparing a selecting signal and the comparing voltage to generate a comparing signal;
   (d) generating a control signal according to the comparing signal; and
   (e) controlling the rotation of the motor according to the control signal.

14. The driving method as claimed in claim 13, wherein the step (a) comprises charging/discharging of a second capacitor to generate the basis voltage and charging/discharging of a first capacitor to generate the voltage signal according to the basis voltage.

15. The driving method as claimed in claim 13, wherein the step (a) further comprises determining charging/discharging of the second capacitor according to a clock signal.

16. The driving method as claimed in claim 13, wherein the step (b) further comprises the following steps:
   (a) amplifying the reference voltage to generate an adjusting signal; and
   (b) adjusting the value of the voltage signal so as to generate the comparing voltage according to the adjusting signal.

17. The driving method as claimed in claim 16, wherein the reference voltage is either the first input signal or the second input signal.

18. The driving method as claimed in claim 13, wherein the step (c) comprises the following steps:
   (c1) comparing a first input signal and a second input signal to generate a first comparing signal;
   (c2) selectively inputting the first input signal and the second input signal according to the first comparing signal; and
   (c3) generating the comparing signal according to the first input signal and the second input signal.

19. The driving method as claimed in claim 18, wherein the selecting signal is either the first input signal or the second input signal.

20. The driving method as claimed in claim 19, wherein the first input signal is a temperature detecting voltage corresponding to the environmental temperature located outside of the driving device, the second input signal is a predetermined voltage driving the rotation of the motor at the lowest speed.

* * * * *